April 20, 1948.

H. ROGER 2,439,987

PICTURE PROJECTOR AND VIEWER

Filed Dec. 11, 1946

INVENTOR.
HENRY ROGER,
BY
*Irving Seidman*
ATTORNEY

April 20, 1948.  H. ROGER  2,439,987
PICTURE PROJECTOR AND VIEWER
Filed Dec. 11, 1946   3 Sheets-Sheet 2

INVENTOR.
HENRY ROGER,
BY
*Irving Seidman*
ATTORNEY

April 20, 1948. H. ROGER 2,439,987
PICTURE PROJECTOR AND VIEWER
Filed Dec. 11, 1946 3 Sheets-Sheet 3

INVENTOR.
HENRY ROGER,
BY
ATTORNEY

Patented Apr. 20, 1948

2,439,987

UNITED STATES PATENT OFFICE 2,439,987

PICTURE PROJECTOR AND VIEWER

Henry Roger, Sandy Hook, Conn., assignor to Floor-O-Matic, Inc., New York, N. Y., a corporation Application December 11, 1946, Serial No. 715,405

9 Claims. (Cl. 88—24)

This invention relates to a combined projecting and viewing apparatus and has particular reference to a device of this character wherewith pictures upon transparent slides may be projected in one direction to a distant screen, or, by the manipulation of a single element in the projector, the picture upon the slide may be reflected rearwardly to a viewing screen upon the projector.

One object of this invention is the provision of an apparatus of the character described wherein the projecting mechanism is housed in a lower casing and the viewing screen is carried upon an upper housing or hood which is slideable upon and may be removed from the said lower casing.

Another object of this invention contemplates the inclusion therein of an arcuate slide holder which by its use permits of readily interchanging the slides.

Another object of this invention is the means employed therein for removing the viewing portion or hood of the machine from the lower housing.

A further object of this invention resides in the means provided for automatically cutting off the light source while the slide holder is being turned from one slide projecting position to a subsequent position.

Another object of this invention resides in the inclusion therein of a ring shaped slide holder adapted to intermittent rotation through the lower housing and automatic means for controlling the intermittent rotation of the said ring shaped slide holder or carrier.

A further object of this invention is the arrangement therein whereby the various projecting elements in the lower housing may be readily removed from the said lower housing or easily reached for cleansing or replacement.

A still further object of this invention is the inclusion therein of a pivotally mounted reflector element which is adapted to direct the light rays against another reflecting element which in turn deflects the light rays upon a viewing screen at the rear end of the device or swinging the said pivotally mounted reflector element out of line to permit a straight line projection of the image to a distant screen or wall surface.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The invention possesses other objects and features of advantage, some of which, with the foregoing will be set forth in the following description and in the claims wherein parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
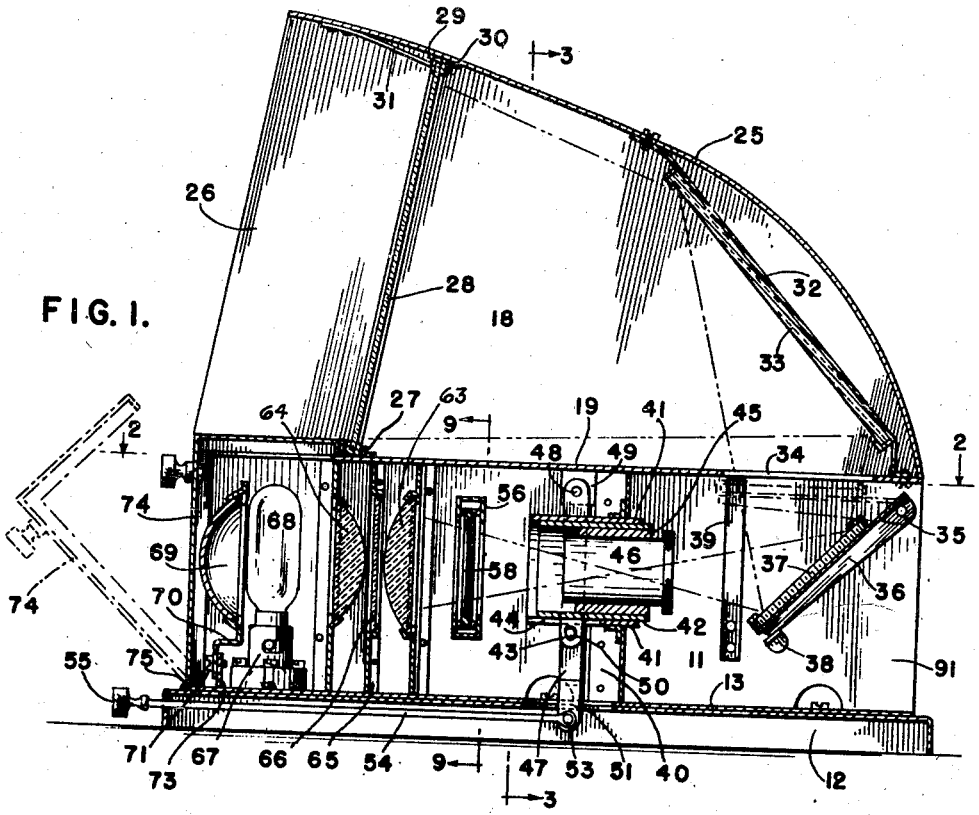
Figure 1 is a longitudinal sectional elevation through the center of the projector approximately along the line 1—1 of Figure 2.
Figure 2:
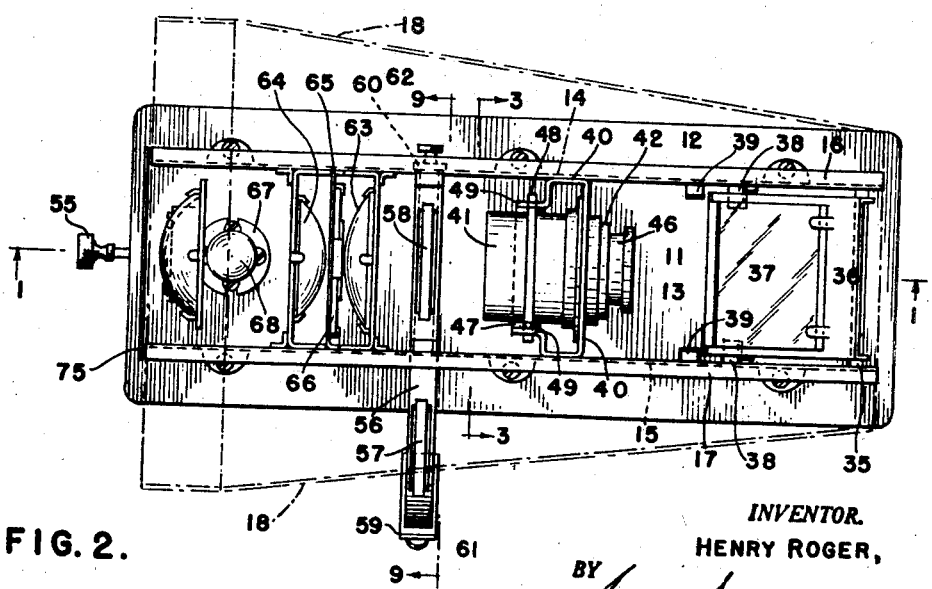
Figure 2 is a top or plan view of the lower compartment or housing of the projector having the upper portion or hood of the device removed and is taken approximately along the line 2—2 of Figure 1.
Figure 3:
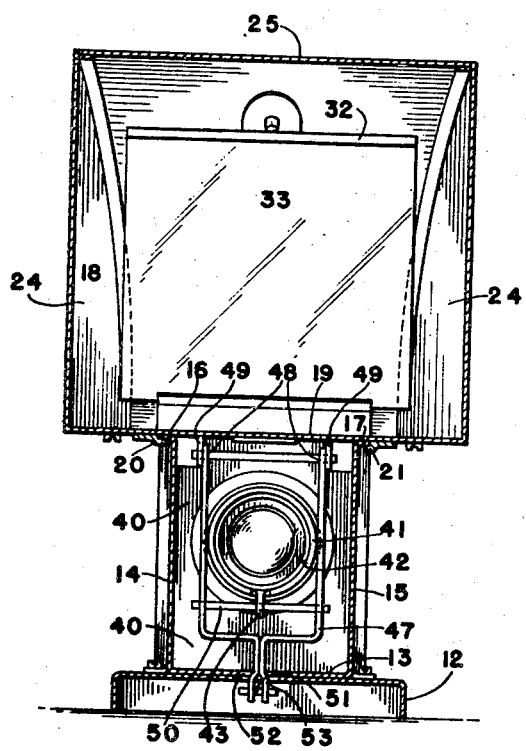
Figure 3 is a cross sectional elevation taken along the line 3—3 of Figures 1 and 2 and looking in the direction indicated by the arrows.

Referring in detail to the parts, 11 designates a lower housing member suitably mounted upon a base 12 and comprising a floor 13, side walls 14 and 15 and having an open top. The upper edges of the said side walls 14 and 15 are formed with laterally projecting flanges 16 and 17 respectively over which an upper housing or hood 18 is adapted to slide. The said upper housing or hood 18 comprises a base member 19 to the under side of which there are attached strips 20 and 21 forming channels in which the said flanges 16 and 17 engage. When the said hood 18 is removed from the lower housing 11 the open top of same may be closed by attaching a cover plate 22 (Figure 9) having grooves 23 which slideably engage over the said flanges 16 and 17.

The said base 19 of the hood 18 extends laterally over and beyond the side walls 14 and 15 of the said lower housing 11 and are formed with upwardly extending side walls 24 and a top 25 having a partially arcuate formation and extending rearwardly to form an open end 26. A channel 27 is formed upon the base 19 and is adapted to receive and hold the lower end of a viewer screen 28 of ground glass or other suitable semi-transparent material. The upper end 29 of the said viewer screen 28 is held against a ledge formation 30 formed upon the under side of the top 25 of the said hood 18 and a clip 31 is employed to hold and lock the said viewer screen in place. Inside the hood 18 under the front arcuate shaped top there is attached, at the proper angle, a frame 32 which supports a reflecting element 33. Directly below this reflecting element 33 is an opening 34 which is formed in the base 19 of the said hood 18.

Arranged to swing in line with the said opening 34 and pivotally connected to the side walls 14 and 15 of the said lower housing at 35, is a frame 36 adapted to carry a reflector element 37 and which is adapted to assume a predetermined angle with respect to the horizontal and is held thereat by means of stops 38 upon each of the said side walls 14 and 15. The said frame 36 and its attached reflector element 37 may be swung upwardly about its pivotal connection 35 to a horizontal position under the said opening 34 and may be held in this position by means of its frictional contact with springs 39 upon the said side walls.

In line with the aforesaid reflector element 37 and slightly distant therefrom is a supporting frame 40 which is secured to the side walls 14 and 15 of the lower housing 11. The said frame 40 carries a bushing 41 secured upon and through same and slideably movable in the said bushing 41 is a sleeve 42 formed with a depending lug 43 which engages through a slot 44 in the said bushing. A cylindrical adaptor 45 is mounted and fixed within the said sleeve 42 and within the adaptor there is mounted a lens carrying cylinder 46. Slideable movement is given to the lens carrying cylinder 46, the adaptor 45 and sleeve 42 by means of a yoke shaped lever 47 which is pivotally attached at 48 to wings 49 formed upon the said supporting frame 40. A pin 50, fixed upon the said yoke lever, engages through a slot 52 formed in the floor 13 of the said lower housing 11 and has a pivotal connection at 53 with an adjustment rod 54 which extends under the said floor 13 to the finger hold 55 on the outside rear end of the said base 12.

Engaging through openings in the side walls 14 and 15 of the said lower housing is an arcuate slide holder 56 which is adapted to move through the openings and which carries two picture slides 57 and 58, one of which is positioned in line for projection while the other is held outside of the said lower casing, from which point the slide may be readily removed and another slide inserted. The said arcuate slide holder 56 may be moved back and forth through the said openings in the side walls 14 and 15 to bring the slide 57 in line for projection while the slide 58 is carried out to the position shown by dot-dash lines in Figure 9. End plates 59 and 60 may be attached by screws or otherwise, to the outer ends of the said arcuate slide holder and act as stop means to properly position the slide holder. Finger holds 61 and 62 may be provided upon the said end plates 59 and 60.

Figure 4:
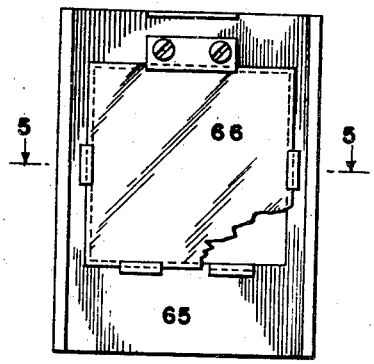
Figure 4 is an elevational view of a part in detail which will be hereinafter described.
Figure 5:
Figure 5 is a sectional view of same taken on line 5—5 of Figure 4.

Condenser lens 63 and 64 are arranged where shown and disposed therebetween is a frame 65 which carries a heat absorbing element 66 of any suitable transparent material (Figures 4 and 5).

Figure 6:
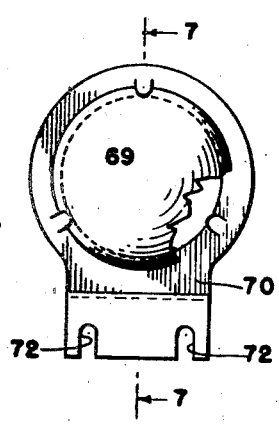
Figure 6 is an elevational view of a detail.
Figure 7:
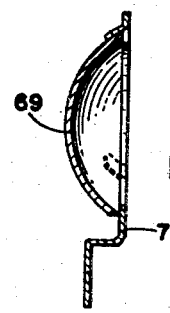
Figure 7 is a sectional elevation of same taken along the line 7—7 of Figure 6.

To the rear of the said lens 64 there is secured to the floor 13 of the lower housing, a socket 67 carrying a light bulb 68 and directly behind same there is mounted a concave reflector unit 69 which is carried in a frame 70 in turn adjustably mounted upon the floor 13. Screws 71 which engage through slots 72 upon said frame 70 (Figure 6) secure the said frame to a cross bar 73 upon the floor 13 of said lower housing.

An L shaped cover 74 is provided at the rear end of the said lower housing and the end of same rests in a groove 75 formed upon the said floor 13.

Figure 11:
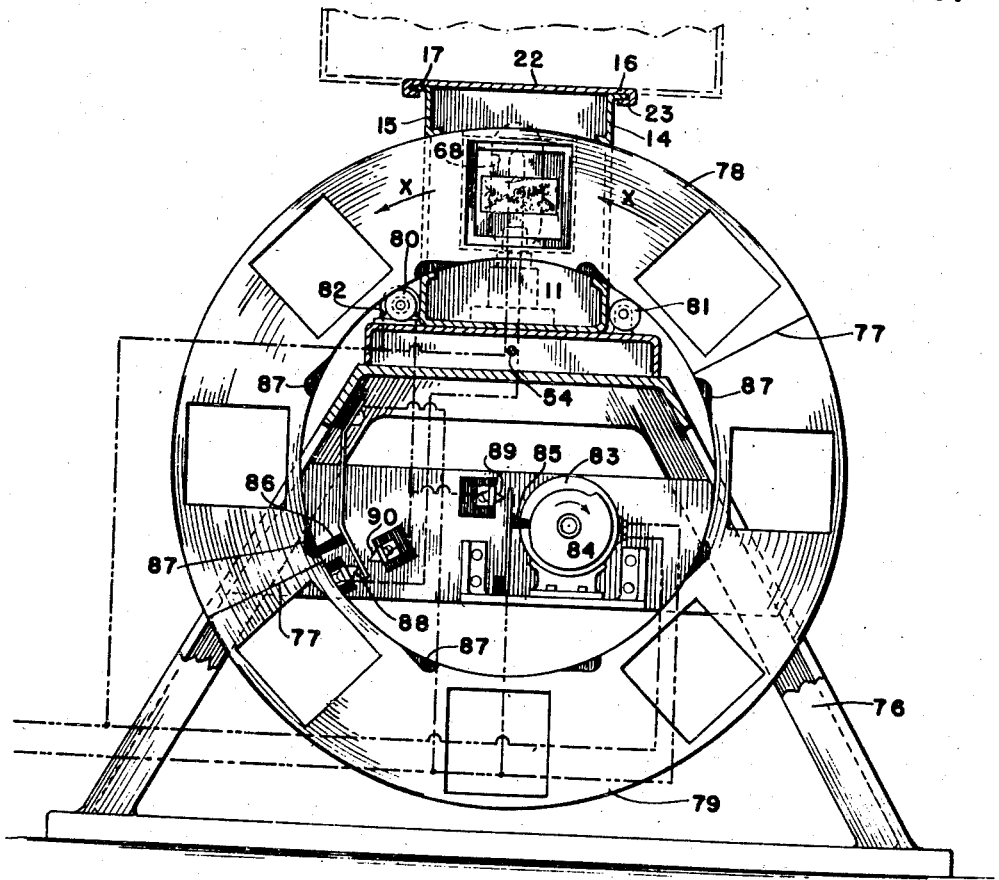
Figure 11 is a sectional elevational view showing another form of slide holder or carrier.

In Figure 11 there is shown a circular or ring shaped slide holder which is adapted to be rotated by a motor and which has an automatic control mechanism to start and stop the revolution of the said slide holder and at the same time successively light and extinguish the light bulb during the start and stop intervals.

When employing this form of slide holder the device, that is the said lower housing unit 11, must be mounted upon a stand 76 and the slide holder must be split or divided as at 77 into two sections 78 and 79, the joining to be accomplished by suitable connecting means upon the inside of the slide holder sections. The said circular slide holder is adapted to engage through openings in the said side walls 14 and 15 of the said lower housing and is carried upon two rollers 80 and 81. The roller 80 is geared to a motor 82 to give rotation to the said circular slide holder.

The mechanism controlling the intermittent movement of the said circular slide holder and the co-ordinating light bulb is actuated by two geared synchronous motors, the drive motor 82, already mentioned, and which operates at intervals and the cam actuating switch control motor 83 which operates continually while the projector is in use. The said motor 83, through gear connections, rotates a cam 84 against which a spring actuated cam follower 85 is adapted to contact and successively close and open an electric circuit to the motor 82. A second spring cam follower 86 is adapted to engage against the inner rim of the said circular slide holder and drops, at intervals measured by the distance between slides, into indentations 87 upon the rim to close an electric circuit at 88 and supply current to the light bulb 68 and at intervals, synchronous with the spacing of the slides in the slide holder, leave the indentations 87 to open the circuit to the light bulb to extinguish same.

The illustration (Figure 11) shows the slide holder or carrier 78—79 at rest and the projection lamp or light bulb 68 on or illuminated.

This position may be considered as the beginning of a cycle. The motor 83 is in operation with the cam follower 85 engaging the recessed portion of the cam 84, no electrical contact being made. However, the cam 84, being geared to the motor 83, rotates slowly and gradually forces the cam follower 85 out to close an electric circuit at the contact point 89 to bring into operation the drive motor 82. The slide holder then rotates in the direction indicated by the arrows X and forces the cam follower 86 out of the indentation 87 to open the circuit at 88 thereby cutting off the light but at the same time making a contact at 90 to continue an electrical current supply to the motor 82 which continues its rotation until the cam follower 86 drops into the next following indentation 87 to break the electrical contact at 90 thereby stopping the motor 82. Electrical contact is again established at 88 to light the bulb 68. The cam 84 is timed to open the circuit at 89 before the circuit is broken at 90.

The springs carrying the cam followers 85 and 86 and the contact points 88, 89 and 90 are insulated from any metallic or electrical conducting material upon the projector or supporting frame but are electrically connected in the various circuits shown in the diagram imposed upon Figure 11. The cam followers are formed of insulator blocks. The cycle of operation just described is repeated for every slide interval of stop and motion while the projector is in operation and are regulated and timed by the movement of the cam follower 86 into and out of each successive indentation 87.

Suitable standard electrical conductor connections (not shown) may be provided to supply electric current to the operating parts of the projector.

Figure 8:
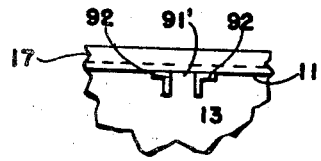
Figure 8 is a fragmentary plan view of a detail.

The various units, namely the condenser lens 63 and 64, the heat absorbing element 65, and the supporting frame 40 are shown riveted to the side walls 14 and 15 of the said lower housing, but in Figure 8 a method is shown for removably holding these said units in place. A groove or runway 91' is formed by riveting, welding or otherwise attaching two angular bars 92 to the side walls of the said lower housing 11. By this method of attachment the various units may be removed and easily replaced.

Operation

Figure 9:
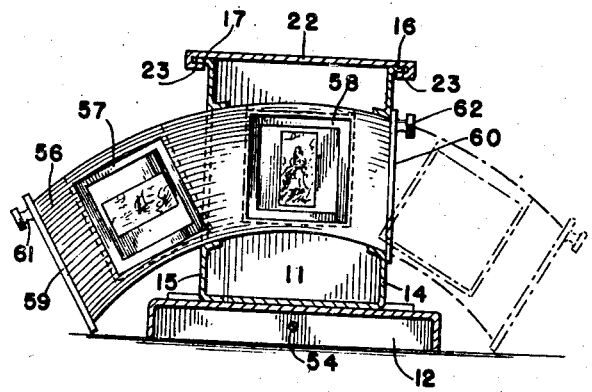
Figure 9 is a sectional elevation taken along the line 9—9 of Figures 1 and 2 looking in the direction indicated by the arrows and shows a top or covering plate substituted for the aforementioned upper housing or hood.

To use the apparatus for rear view projection the projector is set as shown in Figure 1, that is, the reflector element 37 rests at an angle upon the stops 38. The slide holder 56 may be set as shown in Figure 9 to bring the slide 58 in line with the light rays from the light bulb 68 (a second slide being held outside of the projector). The electric current being turned on, the light bulb rays will pass through the condenser lens 63 and 64, the heat absorbing element 66, the slide 58 and the focusing lens 46 to the reflector element 37, from which the light rays are reflected to the reflector 33 and then reflected to the rear viewing screen 28.

When a straight line projection to a distant screen is desired, the frame 36 carrying the reflector element 37 is moved upwardly about its pivotal connection 35 to the position shown by dot-dash line in Figure 1 where it is held by its frictional contact with the side springs 39.

Figure 10:
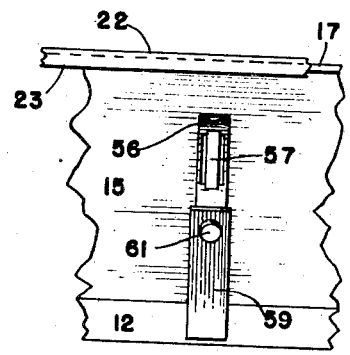
Figure 10 is a fragmentary elevational side view of Figure 9.

If so desired, the hood 18 carrying the reflector element 33 and viewing screen 28, may be removed by sliding same along the flanges 16 and 17 and a top or covering plate 22 (Figures 9 and 10) may be substituted. With the projector so set, the picture upon the slide 58 will be projected in a straight line through the open end 91, of the said lower housing, to a distant screen or wall surface.

The mechanical operation and control of the circular slide holder has already been described. While a split ring slide holder has been shown and described it is obvious that a one section ring slide holder may be employed by making suitable provision on the projector housing and supporting frame to permit the attachment of same.

I claim:

1. A projector comprising a lower housing unit consisting of a light unit therein, condenser lens arranged before the said light unit, a slide holder movable through the side walls and arranged before the said condensers, a lens cylinder containing a focusing lens adjustably mounted in said lower housing unit and arranged before the said slide holder, an adjustable reflector element pivotally mounted in said lower housing unit and placed before the said lens cylinder and a hood slidably attached to the top of the said lower housing unit and consisting of base, side walls and top, the said base being formed with an opening arranged directly above the aforesaid pivotally mounted adjustable reflector element, a stationary reflector element in said hood and arranged at an angle directly above said opening in base of hood and a viewing screen mounted at the rear open end of said hood, the aforesaid pivotally mounted adjustable reflector element in said lower housing, and the stationary reflector element fixed in the said hood coacting to reflect the light rays from the said light unit upwardly and backwardly to the said viewing screen in said hood, spring means coacting with said pivotally mounted adjustable reflector element to hold same in raised inactive position to permit light rays from said light unit to be projected in a straight line to a distant screen, and means for supplying current to illuminate the said light bulb.

2. The projector as set forth in claim 1 wherein the slide holder is arcuate in form and carries two slides, one portion of the said arcuate slide holder being held within the said lower housing to fix one slide in line for projection, while the remaining portion of the said arcuate slide holder carries the second slide and projects outside of said lower housing to permit accessibility to the slide therein.

3. The projector as set forth in claim 1 including therein a transparent heat absorbing element arranged between the said condenser lens to prevent any damage to the slide from the heat of the said light bulb.

4. The projector as set forth in claim 1 wherein a ring shaped slide holder is employed, automatic means to intermittently rotate the said ring shaped slide holder, and automatically controlled means for intermittently cutting off the light from the said light bulb.

5. The projector as set forth in claim 1 including vertically arranged grooves upon the side walls of said lower housing which are adapted to removably hold the various elements in the said lower housing unit.

6. A combined straight line and rear view projector comprising a lower housing unit open along its top and at its front end and an upper housing unit slidably mounted over the top of said lower housing and open at its rear end, the said lower housing containing therein a light bulb near its rear end and successively arranged within the said lower housing in line with light rays from the said light bulb, condensers, slide and adjustable slide holder, focusing lens and an adjustable reflector element adapted to reflect light rays from the said light bulb upwardly and through an opening in the said upper housing, the said slidably mounted upper housing comprising a base having the said light passage opening, a reflector element fixed above said opening in said base of upper housing, and a viewing screen at its rear open end, the said adjustable reflector element in said lower housing coordinating with the fixed reflector element in the said upper housing to project, by reflection, the light rays from the said light bulb in said lower housing to the viewing screen in upper housing, a concentrating reflector behind the said light bulb and means for supplying electric current to the said light bulb.

7. The projector as set forth in claim 6 including an arcuate slide holder carrying two slides and movable through the side walls of the lower housing unit and adapted to position one slide within the lower housing unit in line for projecting an image upon a slide in said slide holder and hold a part of the arcuate slide holder outside of said lower housing unit to permit the ready removal and interchange of a slide in that portion of said arcuate slide holder.

8. The projector as set forth in claim 6 including an adjustment rod connected to the focusing lens and operable from the rear of the projector.

9. The projector as set forth in claim 6 wherein the said upper housing containing the reflector element and viewing screen is removed and a cover plate substituted therefore to make the projector adaptable for straight line forward projection only.

HENRY ROGER.

REFERENCES CITED

The following references are of record in the file of this patent:

UNITED STATES PATENTS

| Number | Name | Date |
|---|---|---|
| 1,428,347 | Van Altena | Sept. 5, 1922 |
| 1,447,403 | Atherton | Mar. 6, 1923 |
| 1,965,688 | Chase | July 10, 1934 |
| 2,022,903 | Thomas | Dec. 3, 1935 |
| 2,037,963 | Brunish | Apr. 21, 1936 |
| 2,195,425 | Roger | Apr. 2, 1940 |
| 2,227,071 | Dilks | Dec. 31, 1940 |
| 2,292,966 | Osterberg et al. | Aug. 11, 1942 |
| 2,391,879 | Chambers | Jan. 1, 1946 |